United States Patent [19]

Huloux

[11] Patent Number: 5,768,310
[45] Date of Patent: Jun. 16, 1998

[54] DATA TRANSMISSION CIRCUIT FOR AN ELECTRICITY MAINS NETWORK HAVING A LOW RECEPTION THRESHOLD

[75] Inventor: Joël Huloux, Le Versoud, France

[73] Assignee: SGS-Thomson Microelectronics S.A., Saint Genis, France

[21] Appl. No.: 568,412

[22] Filed: Dec. 6, 1995

[30] Foreign Application Priority Data

Dec. 16, 1994 [FR] France ................... 94 15523

[51] Int. Cl.$^6$ ............................................. H04L 12/26
[52] U.S. Cl. ...................... 375/222; 375/224; 375/377
[58] Field of Search ........................... 375/220, 222, 375/272, 377, 224; 455/78; 364/140, 492; 370/282

[56] References Cited

U.S. PATENT DOCUMENTS

| | | | |
|---|---|---|---|
| 4,689,801 | 8/1987 | Nurczyk et al. | 375/223 |
| 4,932,037 | 6/1990 | Simpson et al. | 375/200 |
| 5,089,974 | 2/1992 | Demeyer et al. | 364/492 |
| 5,448,593 | 9/1995 | Hell | 375/267 |
| 5,499,318 | 3/1996 | Kopp et al. | 395/2.82 |

OTHER PUBLICATIONS

French Search Report from French Patent Application 94 15523, filed Dec. 16, 1994.

IEEE Transactions On Consumer Electronics, vol. Ce-29, No. 3, Aug. 1983, New York, US, pp. 297–304, F.W. Gutzwiller et al., "Homenet: A Control Network For Consumer Applications".

IBM Technical Disclosure Bulletin, vol. 22, No. 8a, Jan. 1980, New York, US, pp. 3364–3366, "Multi-Access Medium Capture By Preamble Technique".

Primary Examiner—Young T. Tse
Attorney, Agent, or Firm—Wolf, Greenfield & Sacks, P.C.; James H. Morris

[57] ABSTRACT

The invention concerns a data transmission circuit, for use on a mains electricity network, that includes a modulator/demodulator circuit that supplies a first signal, which indicates if the network is occupied, that is based upon a comparison between the level of a received signal and a predetermined threshold value and circuitry for switching a modem into its receive mode or its transmit mode, including a digital circuit that supplies a second signal that indicates the occupation of the network based on the identification of a predetermined data sequence that is present within each transmission stream before a data message and circuitry for allowing the modem to switch to its transmit mode when the occupation signals indicate an absence of a transmission.

24 Claims, 2 Drawing Sheets

DATA TRANSMISSION CIRCUIT FOR AN ELECTRICITY MAINS NETWORK HAVING A LOW RECEPTION THRESHOLD

BACKGROUND OF THE INVENTION

1. Field of the Invention

The present invention relates generally to digital modulators/demodulators (modems) that use an electricity mains network as the transmission medium. More particularly, the present invention applies to the detection of the presence of a transmission signal by any one of a plurality of modems that are connected to the same network.

2. Discussion of the Related Art

Modems that use the electricity mains network as the transmission medium are notably used for domestic applications. In such applications different electrical appliances (heaters, lights, alarms etc.) that are connected to the network are associated with modems and are capable of being controlled by a central controller that can include a programmable timer and/or which can be responsive to a variety of sensors (temperature, fire, flood, security alarms etc.). The central controller can be associated with a system for receiving instructions that are transmitted via a telephone network so as to allow the remote control or the remote programming of one or more events at the domestic installation.

In such an installation, the 50 or 60 Hz mains network constitutes the medium for information to be transmitted. The data to be transmitted is encoded in a binary form and then converted into an analog signal in the form of sampled portions of one or another of two frequencies that constitute the signal to be transmitted around the network. In general, a multi-tone modulated signal corresponds to a Frequency Shift Keying (FSK) signal. The frequencies of the FSK modulation carriers are chosen such that they are greater than the frequency of the distributed electricity. For example, the frequencies of the FSK modulation carriers are chosen such that they are between approximately 95 and 148.5 KHz as opposed to 50 or 60 Hz for the mains supply. The amplitude of the modulated signal is low (in the order of a few volts) with respect to the voltage of the electrical network so that it does not perturb the supply to the different apparatus and appliances that are connected to the network.

FIG. 1 illustrates an example of a data stream containing coded information according to that which is generally transmitted by the central controller or by a modem.

The data stream commences with a data sequence AB that allows the time constant of filters that are used in the demodulation of the data to be set. For example, this sequence is constituted by a series of logic 1 bits during a predetermined time (for example 4 MS) which is a function of the time constant of the modems' filters. The sequence AB is followed by a start bit (SB) that indicates the start of a pseudo-random data message MESS.

The data message MESS includes an address of the domestic installation HA which is identical for all the elements of the installation concerned. This address allows the networked modems to avoid data, denoted INFO, from coming from another installation, for example a neighbouring house, that would otherwise disturb the functionality of the installation concerned.

Next is the address SA of the transmitter of the message. Each apparatus possesses an address that allows the central controller to identify the origin of the information that it receives and for a given apparatus to determine if it is destined for an instruction(s) or data INFO that is transmitted on the network. Next is a destination address DA that corresponds to the address of the apparatus that is the destination of the data that is circulating on the network.

The data stream is terminated by the actual data INFO. This data can constitute, for example; a command instruction for an electrical appliance (lighting, heating, rollerblinds, etc.); a measurement signal supplied by a sensor (thermostat, fire alarm, etc.); or a response supplied by a given apparatus following a command from the central control.

All of the modems of the installation continuously scrutinize, i.e. poll, the network in order to determine if a transmission is present. In other words, all the modems continuously scrutinize the network to determine the state of the network i.e. to determine whether the network is free or occupied.

In order to do this, each modem includes a detection circuit for detecting the presence of a modulated signal that is characterised by the presence of a FSK modulated carrier which indicates that the network is occupied.

When a carrier signal is detected by a given modem, the modem initiates its receive mode and examines the content of the transmitted data to determine whether or not it has been addressed.

As with all apparatus that use a common transmission medium, each apparatus wanting to send out data must firstly ensure that the network is free, that is to say, that no other apparatus, including the controller, is in the process of sending out data.

Thus, if no transmission is detected by the detection circuitry, the modem may switch over to transmission mode so as to transmit data to the central controller or even to the other apparatus.

FIG. 2 represents an example of a conventional circuit for determining whether transmission is occuring on the network. This circuit can be found in all of the modems of each of the apparatus of the installation.

The detection of the presence of a transmission signal, that is characterised by the presence of a FSK modulated signal, is carried out upon the level of energy of a signal that is received by the modem. The modulated signal RAI is extracted from the network by an interface means (not illustrated) that eliminates the high voltage and low frequency components that correspond to the mains carrier. When the network is transmitting, the signal RAI is an analog FSK modulated signal. The signal RAI that is received by a modem is passed on to the detection circuit 1. The circuit 1 includes an integrator 2 that determines the level of energy of the received signal RAI and a comparator 3. A voltage level corresponding to the level of energy of the signal RAI is sent to a first input of the comparator 3, whose second input receives a voltage reference signal VCD, i.e. a threshold voltage. The output of the comparator 3 provides a binary signal CD whose high and low states respectively indicate the absence or presence of a transmission signal.

The signal CD is sent to a digital circuit 5, or processor, that is responsible for controlling the modem and the apparatus that is destined to act upon the received data. This circuit has the task, amongst others, of switching the modem between receive-mode and transmit-mode. This switching is carried out, within the modem, according to the state of the signal provided by the digital circuit 5. The signal TxD is used to control the modem's modulator (not illustrated) and to control a switch 6, or gate, that either allows the data RxD to pass or not to pass to the input of the digital circuits. The data RxD is supplied via the output of the demodulator 7.

A problem that is encountered with this type of transmission is linked to the use of the mains network as a transmission medium. In fact, electrical appliances that are capable of being connected to the mains network generate noise on the network during their operation or during their commutation i.e. turn-on/turn-off. One of the principle sources of noise originates from triacs that are used in adjustable lighting, for example halogen lamps. These triacs generate noise that is synchronized with the mains supply and this noise corresponds to harmonics of the mains supply frequency (50 or 60 Hz). Furthermore, these lights can work for long periods of time. The noise can also originate from switch-mode power supplies or from motors. All this noise is capable of interfering with the transmitted data such that errors are introduced during the routing of the data and thus in its subsequent interpretation.

In order to limit the influence of the noise on the transmitted data, the threshold voltage VCD may be set to a relatively high value. For example, this level is 5 mV whereas the minimum functional level of the demodulator is for example 0.4 mV. Such a threshold value VCD results in a functional range that is reduced by approximately 23 dB.

Such a solution would be acceptable if the signal received by a modem had no risk of being substantially attenuated due to the transmission medium used. This attenuation, which is variable and uncontrollable, is essentially caused by two factors.

The first factor is that the impedance of the network, at the modulation frequencies used, varies as a function of the network load. This variation of impedance, which is essentially inductive, is for example between 1.5Ω and 80Ω at a frequency of 100 kHz. The impedance is variable and cannot be fixed because it depends upon the network load of the installation concerned and the impedance of the distribution transformer. Furthermore, the impedance of the network is dependent upon all of the installations that it supplies. The attenuation due to these variations of impedance is for example between approximately 2 dB and 40 dB for a load that is typically resistive.

The second factor is that the actual electrical connections attenuate the signal. The attenuation is more noticeable if the signal transmitted by a given modem is destined for a modem that is connected to another branch within the mains network. In other words, the passage of the signal via a junction box, a fuse box or circuit breakers leads to a significant attenuation of the signal (in the order of 20 to 30 dB).

FIG. 3 illustrates the consequences of the aforementioned inconveniences concerning the functionality of the circuit represented in FIG. 2. FIG. 3 represents the form of the signal CD and the signal RxD, which is provided by the demodulator 7, that are a function of an example of an FSK modulated signal that is attenuated during certain periods by the effect, for example, of variations in the network impedance.

It should be noted that the received data is not considered as valid and is only therefore demodulated when the level of the signal RAI is greater than the threshold value VCD. Thus, the high voltage value of the threshold VCD of circuit 1 provokes a frequent loss of information due to the attenuation of the transmitted signal.

Furthermore, if the attenuation of the signal RAI of a given modem is such that the level of the signal is less than that of the threshold VCD (FIG. 3), this modem considers that no transmission is present and there is a risk that it may transmit data when the network is already in fact occupied.

In practice, the detection circuit 1, the modulator (not illustrated), the demodulator 7 and the switch 6 are integrated within the same circuit that includes all the other necessary elements that make up a modem and notably the different filters that are necessary for the reception or the transmission of data. An example of such a circuit is known under the commercial part number ST7537 manufactured by SGS-Thomson Microelectronics.

OBJECTS & SUMMARY OF THE INVENTION

An object of the invention is to overcome the inconveniences of known data transmission circuits that are connected to an electrical mains network by providing a circuit that allows the accurate detection, reception and demodulation of an occupied network that has data that is substantially attenuated.

In order to achieve these and other objects, the present invention provides a data transmission circuit, for use on a mains electricity network, that includes a modulator/demodulator circuit that supplies a first signal, which indicates if the network is occupied, that is based upon a comparison between the level of a received signal and a predetermined threshold value and means for switching a modem into its receive mode or its transmit mode, the data transmission circuit further comprises a digital circuit that supplies a second signal that indicates the occupation of the network based on the identification of a predetermined data sequence that is present within each transmission stream before a data message and means for allowing the modem to switch to its transmit mode when said occupation signals indicate an absence of a transmission.

According to another embodiment of the present invention, the digital circuit includes a digital comparator whose first input is connected to the output of a demodulator and whose second input receives a model of said predetermined sequence, which is stored in a memory, and whose output provides said second signal that indicates that the network is occupied. According to another embodiment of the present invention, the identification circuit further includes a shift register that is connected between the output of said demodulator and said first input of the digital comparator, the comparator and said register being controlled by a clock signal that corresponds to the clock signal of the received data.

According to another embodiment of the present invention, the predetermined sequence is chosen such that it presents a low probability of random appearance.

According to another embodiment of the present invention, the transmitted data is modulated by frequency shift keying substantially and that the two modulation carrier frequencies are between 95 and 148.5 kHz.

BRIEF DESCRIPTION OF THE DRAWINGS

These objects, characteristics and advantages amongst others of the present invention will be exposed in detail in the following description of the particular embodiments of realizing the present invention and these embodiments should be regarded as being non-limiting with relation to the attached drawings in which.

DETAILED DESCRIPTION

For purposes of clarity, each of the elements used in the comprehension of the invention has been represented by a reference number. In addition, the elements constituting the different filters of the modem have not been represented. Furthermore, the same elements that are common to different figures have been represented by the same references.

In order to optimize the detection of whether the network is free or occupied by the different modems that are attached to the network, the invention provides an association of the known detection method that is based upon the level of energy of the received signal and the detection of the presence of a transmission that is based upon the identification of a sequence of predetermined data bits.

Figure 1:
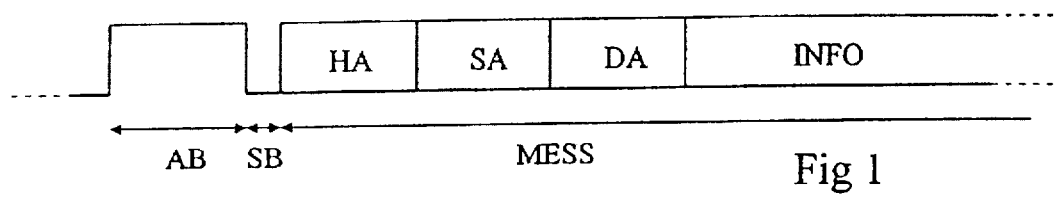
FIG. 1 is an example of a data stream of a known coding scheme.
Figure 2:
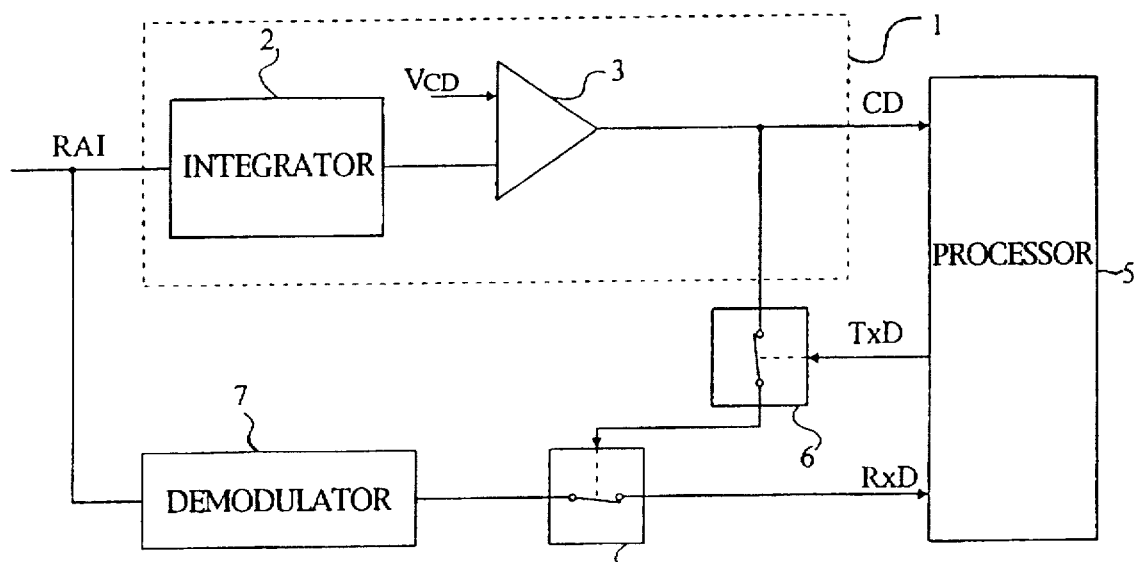
FIG. 2 is a conventional circuit for detecting transmissions on a network.
Figure 3:
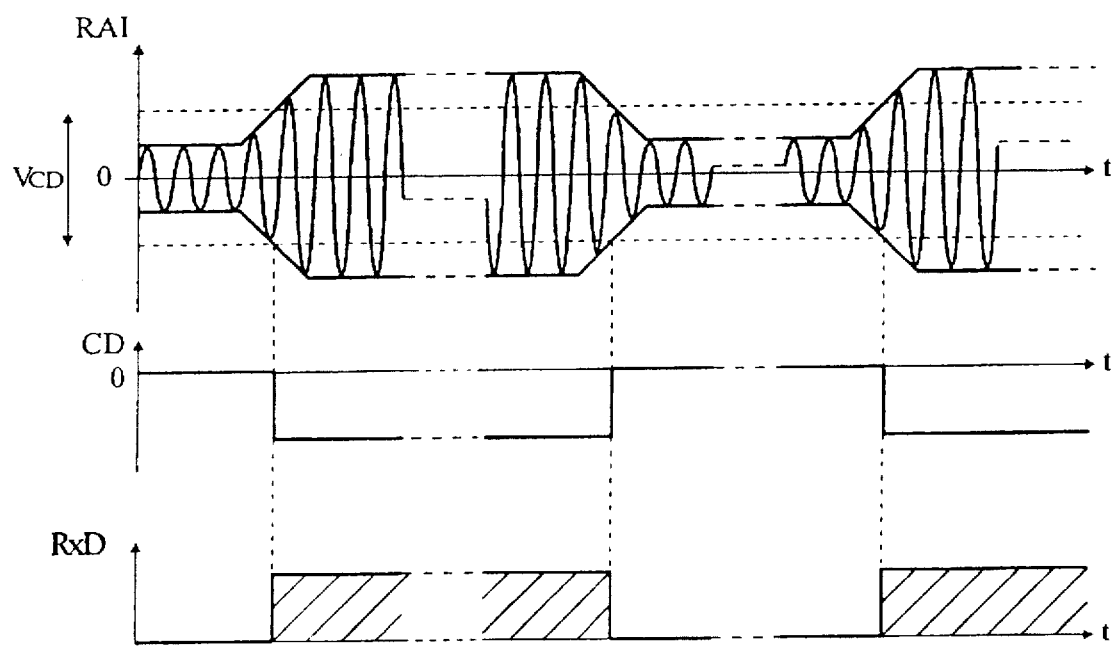
FIG. 3 represents signals as found in the circuit of FIG. 2.
Figure 4:
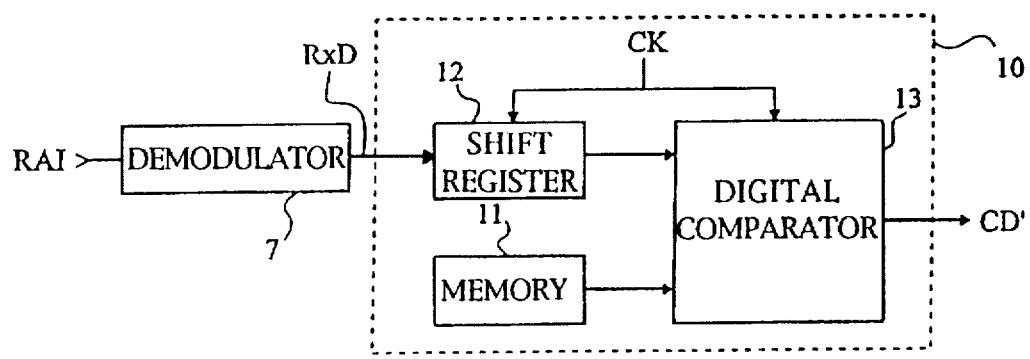
FIG. 4 illustrates an embodiment of a transmission identification circuit according to the invention.

FIG. 4 illustrates an embodiment, according to the invention, of such a sequence detection circuit 10 that is based upon the identification of a sequence of predetermined data.

This circuit 10 includes a memory 11 in which is stored a template or model of the sequence of predetermined data bits. The modulated signal RAI is received by the FSK demodulator 7 from the modem that has been targeted to restore the binary data signal RxD. The signal RxD is received by a shift register 12. The output of this register is connected to a first input of a digital comparator 13 whose second input receives the data bits that are stored in the memory 11. The comparator 13 and the register 12 are controlled by a clock signal CK that has a frequency that corresponds to the clock rate associated with the received modulated signals.

The output of the comparator supplies a signal CD', that has two states, that is used to indicate whether or not there is a transmission on the network. In this case, the identification is carried out by a comparison between the demodulated data and the sequence of predetermined data, i.e. the data model of the memory.

Thus, even if the level of the received signal is substantially attenuated such that a transmission cannot be identified from the signal's energy content, the detector 10 according to the invention is capable of identifying the presence of a transmission on the network. The functional limit of the detector according to the invention is now bound by the sensitivity of the FSK demodulator, which for example can be in the order of 0.4 mV.

However, the functionality of the detector according to the invention requires that all the data streams transmitted by the different modems include the same sequence of predetermined data. This sequence is, according to the invention, chosen such that it has a low probability of being found in the actual transmitted signal itself. Therefore, if such a precaution is taken there will be little risk that the presence of noise on the network is also interpreted as being a transmitted signal.

Figure 5:
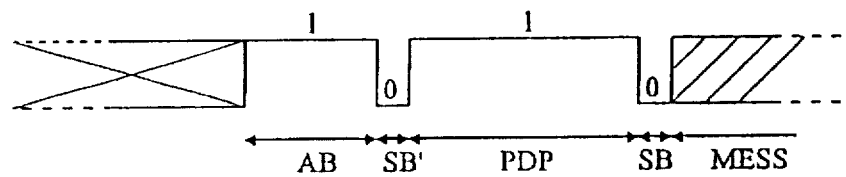
FIG. 5 illustrates an embodiment of a transmission data stream according to the invention.

FIG. 5 represents the structure of a stream of data signals transmitted as a data transmission protocol on a mains network according to the invention.

The distinction with respect to a known data stream is that between the start sequence AB and the start bit SB, a predetermined sequence of bits PDP can be inserted that will allow the receiver within each of the modems to accurately determine the presence of a transmission.

This sequence PDP corresponds to the data model that is stored in the memory 11 of each of the modems of the installation.

The number and value of the consecutive bits of this sequence are chosen such that they are unlikely to correspond to those that may be interpreted due to the effects of noise on the network. On the other hand, it is also preferable to have a sequence that is unlikely to correspond to a pseudo-random data sequence of the message MESS. In fact, once the modem has detected the presence of a coherent data transmission that corresponds to the bit sequence PDP, there is little importance attached to any subsequent bit sequence.

During the presence of substantial noise on the network, the appearance of random bits between two data transmissions that cannot be identified as corresponding to the predetermined sequence will not be considered by any of the modems and the network will be considered as being free for transmission.

The end of a transmission is identified by a unique termination or end data sequence. This end data sequence has a bit sequence that is again chosen such that it is unlikely to correspond to any other data sequence; including a random data sequence. It is preferable to indicate within the end data sequence itself the duration, i.e. the number of bits, of this end data sequence.

By way of an example, the sequence PDP can be chosen by a number of consecutive logic 1 states that have an overall duration that is very improbable as appearing as a random effect caused by noise. In such a case, it is preferable that the sequence PDP is proceeded by a start bit SB' that has a logic 0 state. If the frequencies that are used for the FSK modulation are in the order of hundreds of kHz, a duration of 7 MS can be chosen for example, thus being seven consecutive 1 MS bits for the sequence PDP.

Figure 6:
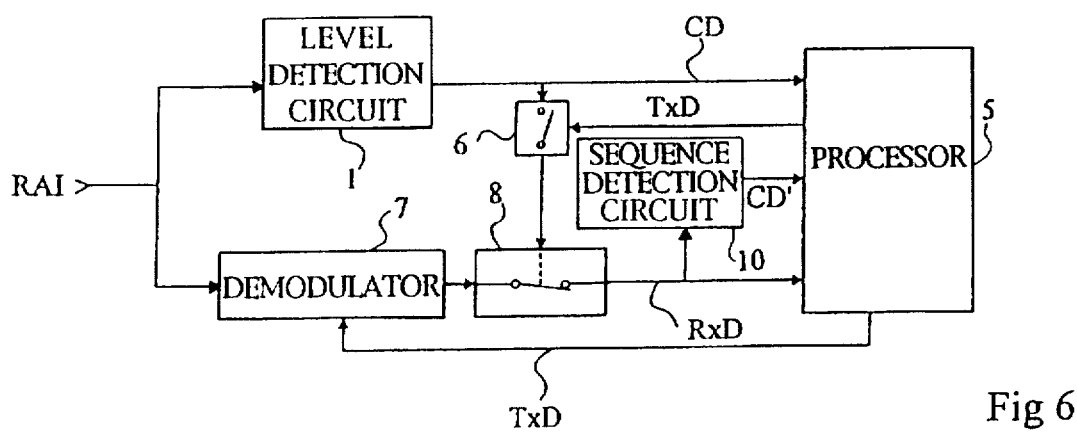
FIG. 6 illustrates an embodiment of a data transmission circuit according to the invention.

FIG. 6 represents an embodiment of a transmission circuit, according to the invention, that can be applied as an adaptation to an existing modem. It can be applied for example to a known modem such as that designated by the commercial part number ST7537 manufactured by SGS-Thomson Microelectronics.

In such a modem, the detection of the presence of a transmission based on the level of energy of a received signal is integrated together with the modulation and demodulation functions. The output of the demodulator 7 which supplies the data RxD to the controlled digital circuit 5 can also supply the shift register 12 of a detection circuit 10 such as that represented in FIG. 4. The respective outputs CD and CD' of the detection circuits 1 and 10 are each connected to an input of circuit 5.

The control logic of circuit 5 is configured so as to force the signal TxD to a state where it closes the switch 6 independently of the state of the signal CD outside the periods where the signal CD indicates the presence of a transmission. In other words, the switch 6 is, according to the present invention, only open during the transmission periods of the modem and only if the two circuits 1 and 10 have not detected the presence of a transmission.

An advantage of the association between the two detectors is that it prevents a modem from not identifying a data transmission if there is a substantial amount of noise on the network; the noise being within the bandwidth at which the detectors operate. Thus, the risk of errors is limited during transmission by starting each transmission at a time when the network is in an optimal situation.

Of course, the present invention is susceptible to many variations and modifications that will become apparent to those skilled in the art. In particular, each of the above described components may be replaced by one or more elements that carry out the same or similar functions.

Furthermore, the invention can be used whatever type of modulation is used and whatever type of digital data and structure of message to transmit.

Moreover, even though certain of the above explanations have been given, for reasons of clarity, by a vocabulary which somewhat corresponds to an analog functionality, it will be clear to those skilled in the art that all of the elements of the detection circuit according to the present invention manipulate digital signals and that the constituent parts of the circuits illustrated can in practice be implemented in software.

Although this invention has been described in connection with certain preferred embodiments, it should be understood that the present disclosure is to be considered as an exemplification of the principles of the invention and that there is no intention of limiting the invention to the disclosed embodiments. On the contrary, it is intended that all alternatives, modifications and equivalent arrangements as may be included within the spirit and scope of the appended claims be covered as part of this invention.

What is claimed is:

1. A data transmission circuit, for use on a mains electricity network, includes a circuit that supplies a first signal that indicates one of when the network is occupied and when the network is not occupied based upon a comparison between a level of a received signal and a predetermined threshold value and means for indicating one of a receive mode and a transmit mode, includes a digital circuit that supplies a second signal different from the first signal that indicates one of occupation of the network and non-occupation of the network based on identification of a predetermined data sequence that is present before a data message within the received signal on the network and means for indicating the transmit mode when said first and second signals each indicates the network is not occupied.

2. The data transmission circuit according to claim 1, wherein said digital circuit includes a digital comparator having a first input to receive an output of a demodulator and a second input receiving a model of said predetermined data sequence, which is stored in a memory, and having an output providing said second signal that indicates that the network is occupied.

3. The data transmission circuit according to claim 2, wherein said digital circuit further includes a shift register connected between the output of said demodulator and said first input of the digital comparator, the comparator and said register being controlled by a clock signal that corresponds to a clock rate of the received data message.

4. The data transmission circuit according to claim 1, wherein said predetermined data sequence comprises a plurality of consecutive data bits.

5. A data transmission circuit according to claim 1, wherein the data message is modulated by frequency shift keying.

6. A data transmission circuit according to claim 1, wherein said predetermined data sequence is chosen such that it presents a low probability of occurring randomly in the received signal.

7. The data transmission circuit according to claim 6, wherein said predetermined data sequence comprises a plurality of consecutive data bits.

8. The data transmission circuit according to claim 7, wherein said predetermined data sequence comprises at least one data bit at a first logic state and at least one other data bit at a second logic state.

9. A system for detecting a data message on a mains electricity network, the system comprising:

an input lead to receive a modulated signal;

a level detecting circuit coupled to the input lead, the level detecting circuit to output a level detect signal having a first state indicating an absence of a transmission signal on the network and a second state indicating a presence of the transmission signal;

a demodulator coupled to the input lead, the demodulator to output a demodulated signal at a demodulator output;

a sequence detector coupled to the demodulator output, the sequence detector to output a sequence detect signal having a third state indicating detection of a predetermined data sequence and a fourth state indicating non-detection of the predetermined data sequence; and a digital circuit to receive the level detect signal and the sequence detect signal, the digital circuit to determine a data message has been detected when the level detect signal is in the second state and the sequence detect signal is in the third state at a same time.

10. The system as recited in claim 9, wherein the predetermined data sequence comprises a plurality of consecutive data bits.

11. The system as recited in claim 10, wherein the predetermined data sequence is chosen such that it presents a low probability of occurring randomly on the network.

12. The system as recited in claim 11, wherein the predetermined data sequence comprises at least one data bit at a first logic state and at least one other data bit at a second logic state.

13. The system as recited in claim 9, further comprising a switch to couple the demodulated signal to the sequence detector only when the level detect signal is in the second state.

14. The system as recited in claim 9, wherein the sequence detector comprises:

a digital comparator to compare the demodulated signal to the predetermined data sequence and output the sequence detect signal in the third state when the predetermined data sequence has been detected.

15. The system as recited in claim 14, wherein the sequence detector further comprises:

a shift register coupled between the demodulator output and the input of the digital comparator, the shift register transmitting the demodulated signal to the comparator at a clock rate of the demodulated signal.

16. The system as recited in claim 9, wherein the sequence detector further comprises:

a memory to store the predetermined data sequence.

17. A system for detecting a data message on a mains electricity network carrying a modulated signal, the system comprising:

first means for receiving the modulated signal;

means for comparing a modulated signal level of the modulated signal to a predetermined threshold level and generating a level comparison signal when the modulated signal level is at least the threshold level;

means for generating a demodulated signal from the modulated signal;

second means for detecting a predetermined data sequence in the demodulated signal and for outputting a sequence detect signal at one of a first level when the predetermined data sequence has been detected and a second level when the predetermined data sequence has not been detected; and third means for determining the data message has been detected when the sequence detect signal is at the first level and the level comparison signal is present, otherwise determining that the data message has not been detected.

18. The system as recited in claim 17, wherein the predetermined data sequence comprises a plurality of consecutive data bits.

19. The system as recited in claim 17, wherein the second means comprises comparing means for comparing the demodulated signal to the predetermined data sequence.

20. The system as recited in claim 17, wherein the second means further comprises storage means for storing the predetermined data sequence.

21. A method for detecting when a mains electricity network is available for transmitting a data message, the method comprising the steps of:

(a) receiving a modulated signal on the network;

(b) comparing a modulated signal level of the modulated signal to a predetermined threshold level;

(c) generating a level comparison signal in a first state when said step (b) indicates the network is available;

(d) generating the level comparison signal in a second state when said step (b) indicates the network is not available;

(e) demodulating the modulated signal to create a demodulated signal;

(f) determining whether or not a predetermined data sequence is found in the demodulated signal; and (g) when the predetermined data sequence has been found in the demodulated signal and the level comparison signal is in the second state, indicating that the mains electricity network is not available, otherwise indicating that the mains network is available.

22. The method as recited in claim 21, wherein the step of determining whether or not the modulated signal is present on the network comprises the step of:

determining whether or not the modulated signal level of the modulated signal is at least the predetermined threshold level.

23. The method as recited in claim 21, wherein the predetermined data sequence comprises a plurality of consecutive data bits and step (f) comprises the step of:

comparing the consecutive data bits of the predetermined data sequence to consecutive data bits of the demodulated signal at a clock rate of the demodulated signal.

24. The method as recited in claim 21, further including a step of choosing the predetermined data sequence to be one that presents a low probability of occurring randomly in the demodulated signal.

* * * * *